(12) United States Patent
Kauffman et al.

(10) Patent No.: US 7,206,854 B2
(45) Date of Patent: Apr. 17, 2007

(54) SEAMLESS ARBITRARY DATA INSERTION FOR STREAMING MEDIA

(75) Inventors: Marc W. Kauffman, Encinitas, CA (US); Jonathan Fellows, Del Mar, CA (US)

(73) Assignee: General Instrument Corporation, Horsham, PA (US)

( * ) Notice: Subject to any disclaimer, the term of this patent is extended or adjusted under 35 U.S.C. 154(b) by 780 days.

(21) Appl. No.: 09/734,220

(22) Filed: Dec. 11, 2000

(65) Prior Publication Data

US 2002/0073084 A1    Jun. 13, 2002

(51) Int. Cl.
*G06F 15/16* (2006.01)
(52) U.S. Cl. ..................................... 709/231
(58) Field of Classification Search ................. 709/231
See application file for complete search history.

(56) References Cited

U.S. PATENT DOCUMENTS

| | | | |
|---|---|---|---|
| 5,586,264 A | | 12/1996 | Belknap |
| 5,761,417 A | | 6/1998 | Henley et al. |
| 5,805,821 A | | 9/1998 | Saxena et al. |
| 5,948,061 A | * | 9/1999 | Merriman et al. ........... 709/219 |
| 5,961,593 A | * | 10/1999 | Gabber et al. ............... 709/219 |
| 5,983,267 A | * | 11/1999 | Shklar et al. ............... 709/217 |
| 5,996,015 A | * | 11/1999 | Day et al. .................... 709/226 |
| 6,094,677 A | * | 7/2000 | Capek et al. ................ 709/219 |
| 6,138,142 A | * | 10/2000 | Linsk .......................... 709/203 |
| 6,141,010 A | | 10/2000 | Hoyle |
| 6,266,681 B1 | * | 7/2001 | Guthrie ..................... 715/501.1 |
| 6,477,575 B1 | * | 11/2002 | Koeppel et al. ............. 709/224 |
| 6,496,857 B1 | * | 12/2002 | Dustin et al. ................ 709/219 |
| 6,516,338 B1 | * | 2/2003 | Landsman et al. .......... 709/203 |
| 6,564,243 B1 | * | 5/2003 | Yedidia et al. ............... 709/203 |
| 6,606,644 B1 | * | 8/2003 | Ford et al. ................... 709/203 |
| 6,615,039 B1 | * | 9/2003 | Eldering ..................... 455/418 |
| 6,698,020 B1 | * | 2/2004 | Zigmond et al. ............. 725/34 |
| 6,704,930 B1 | * | 3/2004 | Eldering et al. .............. 725/36 |
| 7,146,627 B1 | * | 12/2006 | Ismail et al. .................. 725/47 |

FOREIGN PATENT DOCUMENTS

WO        WO9955066 A1    10/1999

* cited by examiner

*Primary Examiner*—Patrice Winder
*Assistant Examiner*—Thomas Duong
(74) *Attorney, Agent, or Firm*—Larry T. Cullen

(57) ABSTRACT

An arrangement for inserting advertisement media into a streaming multimedia file destined for an end-user uses a caching inserter including a first cache for storing a loaded advertisement file and a second cache for holding the streaming multimedia file that needs to be buffered as the advertisement file is sent to the end-user. The advertisement file may be inserted at the beginning of the multimedia file, the end, or at any point during the stream. Once the advertisement begins to be sent to the end-user, the incoming multimedia stream is cached and then is played out of the cache once the advertisement has ended. As a result of the time delay associated with the advertisement, the remainder of the multimedia file must be cached then played out until the stream is complete.

29 Claims, 2 Drawing Sheets

SEAMLESS ARBITRARY DATA INSERTION FOR STREAMING MEDIA

TECHNICAL FIELD

The present invention relates to a methodology for inserting data such as advertising in streaming media and, more particularly, to a method for inserting such data at arbitrary locations along the stream.

BACKGROUND OF THE INVENTION

Traditional methods of delivery of multimedia data to end users fall into two categories: 1) broadcast industry methods and 2) computer industry methods. Broadcast methods (including motion picture, cable, television network, and record industries) generally provide storage in the form of analog or digitally recorded tape. The playing of tapes causes isochronous data streams to be generated which are then moved through broadcast industry equipment to the end user. Computer methods generally provide storage in the form of disks, or disks augmented with tape, and record data in compressed digital formats such as DVI, JPEG and MPEG. On request, computers deliver non-isochronous data streams to the end user, where hardware buffers and special application code smooths the data streams to enable continuous viewing or listening.

"Streaming media" is now considered to be a term of art and defines the capability to download multimedia files in real time (or "near real" time) and play the file on an end-user device, such as through a set-top box on a television or on a computer display device.

In the current state of the technology, it is possible to also download advertisements (or other media) to end users once the video or other presented material in the stream is completed. The need to "wait" until the end of the program thus limits the number, as well as the duration of advertisements that can be presented to end users.

Thus, a need remains in the art for an arrangement capable of inserting other video sources into a streaming media download.

SUMMARY OF THE INVENTION

The need remaining in the art is addressed by the present invention, which relates to a methodology for inserting data such as advertising in streaming media and, more particularly, to a method for inserting such data at arbitrary locations along the stream.

In accordance with the present invention, a "caching inserter" system is disposed at a local point of presence (POP) which intercepts a video stream destined for an end user. When insertion of advertising (or other information—such as a "news" bulletin weather information, for example) is desired, the video stream is stored/buffered at the local POP and the advertisement is played. When the ad is completed, the first stream is then played out of the buffer. Once the video has begun to enter and fill the buffer (that is, once an ad is inserted in the stream), the buffer must remain in the signal path for the duration of the video stream.

In an alternative embodiment of the present invention, the ad may first be loaded into a buffer at the POP and once the ad has begun, the concatenation point of the video stream can be appended to the end of the advertisement file. In this case, the length of the advertisement need not be monitored and no further action is required, since the video stream will simply re-commence when the ad is finished.

The POP where the advertisement cache is located could be at any convenient place along the signal path between the information source(s) and the end-user. For example, the advertisement cache could be at the headend, or at a FTTH node in a neighborhood. At the extreme, the advertisement cache could be part of a set-top box at the end-user location. Obviously, the location of the advertisement cache then affects the number of separate end users that can receive the same advertisement. Particularly, the further upstream the advertisement cache is located, the greater the broadcast potential of a particular ad. Advantageously, however, judicious location and control of various advertisement contents can be incorporated into the present invention such that content can be targeted to particular end users.

It is an advantage of a particular arrangement of the present invention that the requirement of passing an advertisement stream through a cache allows for various statistics to be collected at the POP, such as the number of times a particular ad is played, the number of end users that viewed the ad, the time of day and day of week the ad was played, etc. Such information can then be collected by a billing system and used to derive price information for use with the advertisement suppliers.

Various other features and advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
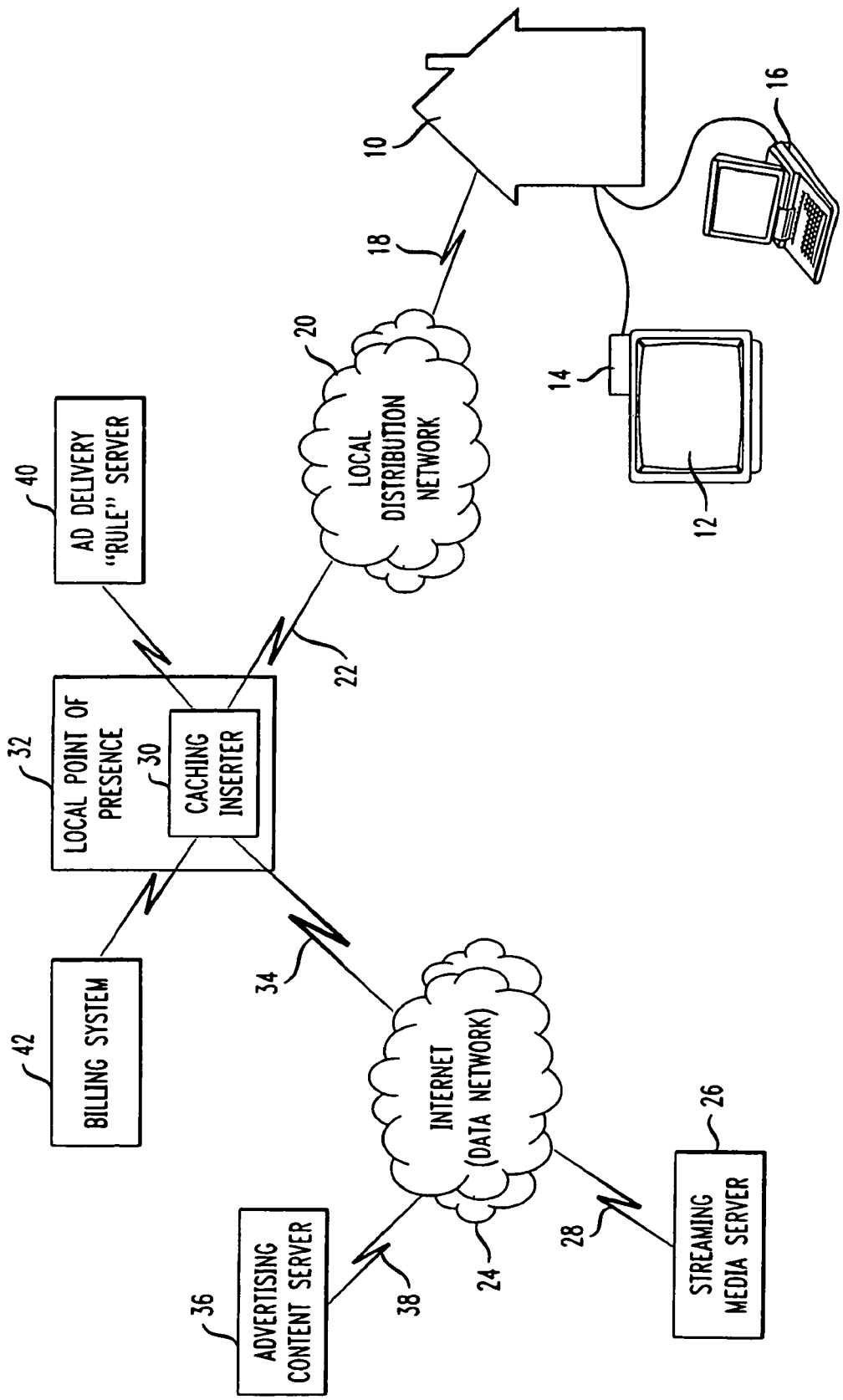
FIG. 1 is a system-level block diagram illustrating the capability of inserting advertisement into streaming multimedia in accordance with the present invention.

An exemplary architecture for supporting the insertion of an alternative message into streaming multimedia in accordance with the present invention is illustrated in FIG. 1. For the purposes of discussion, the "alternative message" will be referred to as an "advertisement" and, in one embodiment, may be advertisements that are targeted to the interests of the specific subscriber/end-user (hereinafter referred to simply as an "enduser"), where the phrase "end-user" is considered to include both a single end-user and a group of end-users (as in the case of a "multicast"/"broadcast"). However, it is to be understood that various other types of messages may also be inserted into a streaming multimedia download. For example, news or weather emergency messages may be inserted, if warranted, into an on-going multimedia stream.

Referring to FIG. 1, an end-user 10 is depicted as a residential end-user that is capable of receiving multimedia information through either a television 12 (using a set-top box 14 or other appropriate residential gateway device) or a computer terminal 16 (including appropriate software to convert the received files and play them on the display of computer 16). In a preferred architecture, a coaxial cable connection 18 is used to provide communication between end-user 10 and a head-end, or local distribution network 20

(alternatively, connection 18 may comprise a DSL connection or a wireless connection). Although not depicted in the diagram of FIG. 1, local distribution network 20 is similarly connected to a multiplicity of end-users and, in fact, may be connected to these users in a tree-and-branch architecture. For conventional communications, local distribution network 20 is connected through one or more links 22 (in most cases, optical fiber links) to a data network 24 (which may be referred to as the Internet). Multiple sources of information, resident on servers, are connected through their own links to data network 24, and other sources are likewise interconnected and are able to communicate with each other using data network 24. For the purposes of the present discussion, one such multimedia server 26 and a communication link 28 are shown in FIG. 1 as connected to data network 24, where the content stored on multimedia server 26 is thus accessible by end-user 10. In a conventional use of this arrangement, end-user 10 would send a request through local distribution network 20 and into data network 24 for one or more multimedia files to be downloaded and "played" on one of his devices (for example, television 12 or computer 16). A link would be established between end-user 10 and the appropriate multimedia server 26 holding the file requested by the end-user. With the link established, the requested file is "streamed" down the communication links to end-user 10 in a continuous fashion, allowing for uninterrupted viewing (of, for example, a movie, music video, or the like) of the multimedia content of the file.

In accordance with the present invention, additional components have been implemented in the communication path to allow for advertisements (or other messages, as mentioned above) to be inserted in streaming multimedia in a seamless fashion, that is, without the need to "wait" for predetermined time slots or breaks in the multimedia stream. Referring to FIG. 1, a "caching inserter" 30, located in a local point-of-presence (POP) 32 along the path between data network 24 and local distribution network 20 functions to monitor incoming streaming multimedia along link 34 and insert, as discussed in detail below, an advertisement, at a location along the stream. The advertisement medium itself may be resident on a separate advertisement content server 36 coupled by a separate data link 38 to data network 24. A "rule" server 40 is shown in FIG. 1 and may be used to direct particularly advertising content to specific end-users, where rule server 40 interacts with caching insert 30, as shown in FIG. 1. In order to control payment for the advertisement insertion service, a separate billing system 42 may also be associated with caching inserter 30.

In operation, a specific end-user first requests a particular multimedia file to be accessed and streamed into one of his devices. Referring to FIG. 1, such a request first passes through caching inserter 30 and then enters data network 24, which seeks out a specific server 26 holding the desired multimedia file. In order to identify a flow that contains streaming multimedia content, caching server 26 may detect a request or, through examination of the content of the flow, detect the download of a multimedia file. Once caching inserter 30 receives the initial request, the identity of end-user 10 may be forwarded to rule server 40 that can then access its internal database to determine the type of advertisement (or other information) that would most likely be of interest to that user. For example, end-user 10 may be interested in antique cars and that information would be stored in "rule" server 40, along with the IP address(es) of servers holding advertisement information related to antique cars. Rule server 40 then sends the IP address information back to caching inserter 30 which then accesses data network 34 to retrieve a particular advertisement multimedia file (from, for example, advertising content server 36). The retrieved advertisement file is then forwarded to and cached at caching inserter 30.

In accordance with the present invention, once caching inserter 30 has an advertisement file available (either stored, or available as a stream from the advertisement server), the incoming (requested) multimedia file destined for end-user 10 can be cached, and the advertisement multimedia file streamed in its place to end-user 10 in a seamless manner. The multimedia file itself is not stopped at any point, but is continuously cached by caching inserter 30 as it is received from streaming media server 26. At the end of the advertisement file, the stored multimedia stream is played out and, for the duration of the stream, will continue to pass through a cache, since there will continue to be a time delay between the incoming stream to caching inserter 30 and the outgoing stream to end-user 10 (the "delay" being the length of the inserted advertisement). Since the end time of the advertisement is known by caching inserter 30, the streaming multimedia file can merely be appended to the end of the advertisement, allowing the playing of the requested file to recommence in a seamless manner without further action required by caching inserter 30.

As shown in FIG. 1, a billing system 42 may be included in the arrangement and configured to receive input information from caching inserter 30. That is, billing system 42 may be used to collect information regarding the identity of the various advertisement files that are requested and the number of times each file is requested. Other information, such as the time of day of the request, day of the week, etc., may also be collected. This information is useful both for the supplier of the advertisements and for billing the advertisement for the supplied service (e.g., the identity of the end-user(s) viewing the advertisement, the number of times a particular ad is requested in a day/week, etc.).

Although only one such end-user is shown in FIG. 1, it is to be understood that caching inserter 30 of the present invention is to be used with multiple users, where rule server 40 includes in a database information of a plurality of known end-users and is capable of requesting various types of files that are pertinent to different end-users. Moreover, caching inserter 30 itself is capable of caching any desired number of separate advertisements and controlling the insertion of the advertisements in the proper streaming multimedia files, while at the same time caching and then controlling the sending out of the cached multimedia files to the appropriate end-users.

Figure 2:
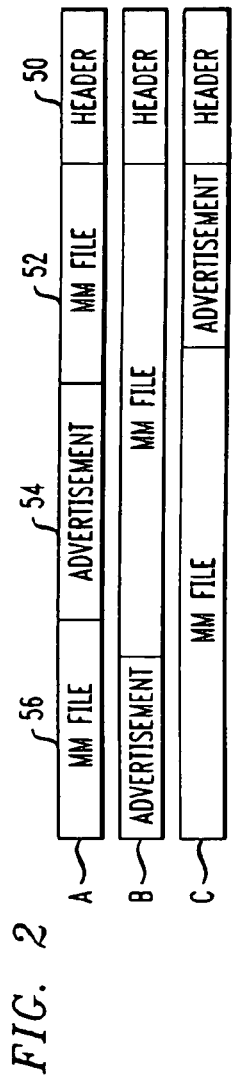
FIG. 2 contains two separate diagrams of media stream, one including advertisement as a prefix and the other including advertisement embedded within the multimedia stream.

In one embodiment of the present invention, the multimedia stream will begin to reach the end-user before an advertisement is inserted, as represented by diagram A in FIG. 2. In this case, an initial header slot 50 is understood by the receiving device (set-top box or computer) as the requested multimedia file. The receiving device is then properly configured to play the streaming multimedia file, which follows as segment 52 of diagram A. At some point along the playing of the file, an advertisement is inserted as segment 54 and the remainder of the multimedia stream, represented as segment 56, is appended to the end of the advertisement, as discussed above. In one example, a timing signal in the multimedia file may be used as a "trigger" to initiate the insertion of the advertisement into the stream. Alternatively, the advertisement may simply be cached and held until the end of the multimedia stream, as shown in diagram B of FIG. 2, or played as the initial segment (between the header and the streaming multimedia), as shown in diagram C. In any alternative, additional bytes may be added to the beginning and end of the advertisement file to create a "fade in" and "fade out" between the advertisement and requested multimedia stream, where such fading is considered to be more acceptable by the end-user than a sharp break between the independent streams.

Figure 3:
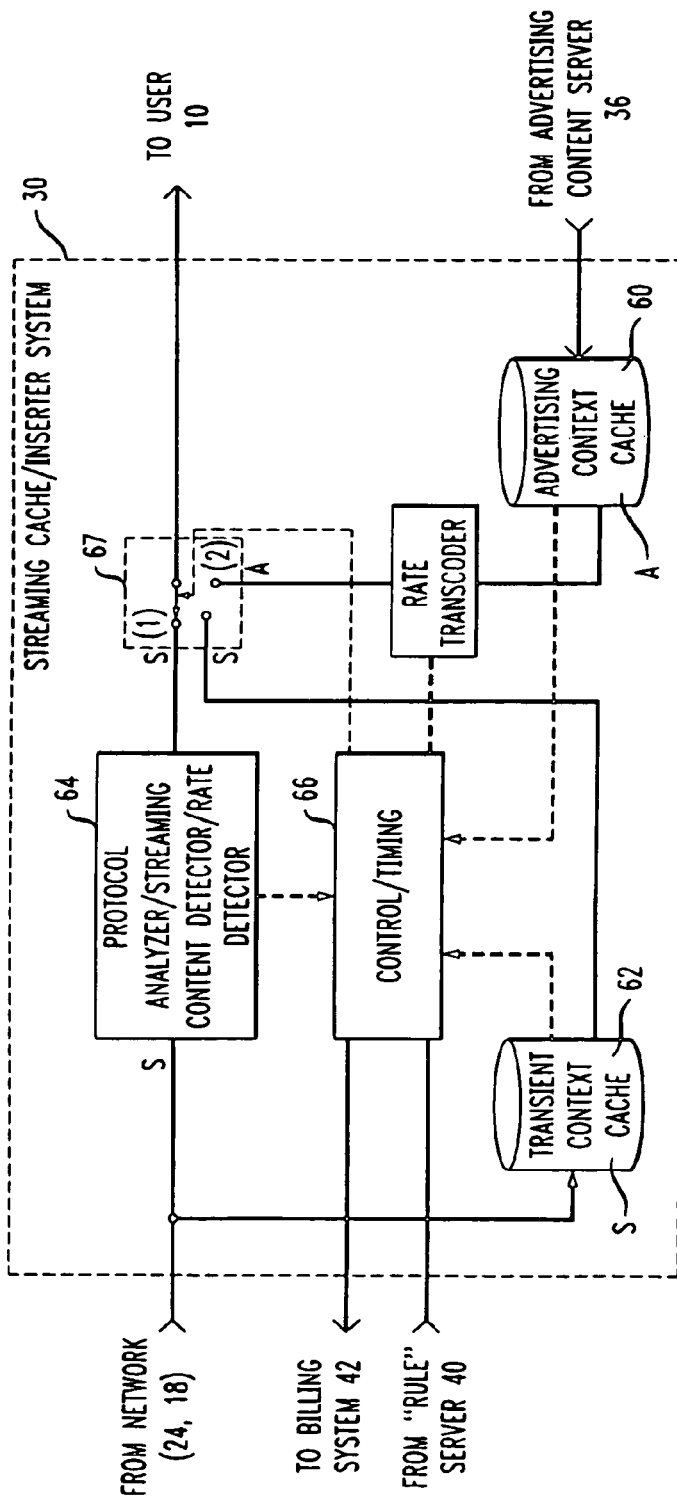
FIG. 3 illustrates an exemplary cache/inserter arrangement that may be utilized to implement the arrangement of the present invention.

FIG. 3 illustrates an exemplary caching inserter 30 that may be used in the system of the present invention as described above in association with FIG. 1. Included within caching inserter 30 is a first cache 60 used to store an incoming specific advertisement file, designated as stream A, from advertisement content server 60. A second cache 62 is used to store the incoming multimedia stream, designated as stream MM, where as discussed above, cache 62 is used to store incoming stream MM once advertisement stream A has begun to be "played out" toward end-user 10. An analyzer 64 is included in the communication path between the network (which may be data network 24, local distribution network 20, or any other communication network, since caching inserter 30 may be disposed at any appropriate location along the path between the various multimedia servers and end-users) and end-user 10. Analyzer 64 will detect when a multimedia stream has been received, determine the associated protocol and rate, and transmit this information to a timing and control unit 66. Other control inputs to timing and control unit 66 are from advertising content (first) cache 60 and multimedia content (second) cache 62, where control unit 66 uses the input from these caches to determine the proper stream to be played out to end-user 10. For example, unless and until a full advertisement file is loaded in first cache 60, multimedia stream MM can be played coupled in real time to end-user 10, indicated as position (1) of switch 67 of inserter 30. When control unit 66 receives a particular indication from first cache 60 (such as "EOF" received), it knows that advertisement stream A is ready to be played out and multimedia stream MM can be held. A signal is then sent from timing and control unit 66 to switch 67, requesting the switch to move to position (2), allowing the cached advertisement stream A to be sent to end-user 10. Once this process begins, multimedia stream MM will begin to be stored in second cache 62. When timing and control unit 66 receives a command that the end of the advertisement has been reached, a signal to move switch 67 to position (3) will be sent, allowing the cached multimedia stream to be sent to end-user 10. If the advertisement is inserted at the beginning of or during the multimedia stream, the received multimedia stream will need to be stored in, then played out of, second cache 62 for the duration of the multimedia file. A rate and/or format transcoder 68 may also be included in the signal path between first cache 60 and end-user 10 to insure that the advertisement is transmitted at the same data rate and format as the requested multimedia file, where this information has previously been retrieved by analyzer 64, or by some other means.

While the arrangement as described above illustrates the various servers as being in geographically disparate locations, it is to be understood that one or more may be co-located. Additionally, as noted above, the caching inserter of the present invention may be disposed at any location between the various content servers and the end-user. Indeed, various other modifications to the arrangement as described above will occur to those skilled in the art and are considered to fall within the spirit and scope of the present invention as defined by the claims appended hereto.

What is claimed is:

1. An arrangement for inserting an alternative media file into a streaming multimedia file destined for at least one predetermined end-user, the arrangement comprising a first cache for storing a received alternative media file;
a second cache for storing a streaming multimedia file;
a control unit for receiving as a first input a control signal from said first cache and generating as an output a switching control signal indicative of the presence or absence of a complete alternative media file being stored in said first cache; and
a switching mechanism, coupled to each one of said control unit, said first cache, said second cache and said streaming multimedia file for providing as an output, directed to the at least one end-user, a stream selected from one of said first cache, said streaming multimedia file and said second cache, as controlled by said switching output signal from said control unit so as to insert the alternative media file in the stream,
wherein the alternative media file is inserted in the stream independent of boundaries of the multimedia file.

2. The arrangement as defined in claim 1 wherein the control signal output from the first cache indicates that an alternative file is available to be streamed to said first cache from an external server and is ready to begin transmission to the predetermined at least one end-user.

3. The arrangement as defined in claim 1 wherein the switching mechanism supplies as an output the streaming multimedia file in the absence of a signal from the control unit that an alternative file is ready to transmit.

4. The arrangement as defined in claim 1 wherein the switching mechanism supplies as an output the cached alternative file stored in said first cache in response to a signal from the control unit that an alternative file is ready to transmit.

5. The arrangement as defined in claim 1 wherein the control signal input to said control unit indicates that the alternative media file transfer to the predetermined at least one end-user is completed, the control unit thereafter supplying a switching output signal to said switching mechanism requesting said switching mechanism to supply as the output the cached streaming multimedia file from the second cache.

6. The arrangement as defined in claim 1 wherein the arrangement further comprises a billing system coupled to the control unit for receiving information from said control unit regarding the identity of each alternative media file transmitted, the identity of the at least one end-user, and related statistics regarding the transmission of various alternative media files to a plurality of different end-users.

7. The arrangement as defined in claim 6 wherein the related statistics include the number of times each alternative media file was requested during a predetermined period of time.

8. The arrangement as defined in claim 6 wherein the related statistics includes the time of day and date that each alternative media file was requested.

9. The arrangement as defined in claim 1 wherein the alternative file is defined as an advertisement file.

10. The arrangement as defined in claim 1 wherein the alternative file is defined as an emergency information file.

11. The arrangement as defined in claim 1 wherein the arrangement is disposed at a local point of presence in a communication network.

12. The arrangement as defined in claim 11 wherein the arrangement is disposed at a headend location in an HFC communication network.

13. The arrangement as defined in claim 11 wherein the arrangement is disposed between a wide area data network and a local distribution network.

14. The arrangement as defined in claim 11 wherein the arrangement is disposed between a telecommunications central office and a DSL communication network.

15. The arrangement as defined in claim 11 wherein the arrangement is disposed between a telecommunications central office and wireless communication network.

16. The arrangement as defined in claim 11 wherein the arrangement is disposed in a communications device at an end-user location.

17. The arrangement as defined in claim 16 wherein the communications device comprises a set-top box.

18. The arrangement as defined in claim 16 wherein the communications device comprises a residential gateway device.

19. The arrangement as defined in claim 1 wherein the arrangement further comprises a rule server for retrieving information related to the predetermined at least one end-user and selecting the alternative media file based on said retrieved information and the specific content of the streaming multimedia file.

20. A method of inserting an alternative media file in a streaming multimedia file destined for a predetermined end-user, the method comprising the steps of:
   a) storing a selected alternative multimedia file in a first cache at a local point of presence;
   b) establishing a communication link between said streaming multimedia file and said predetermined end-user;
   c) transmitting said streaming media file to said end-user;
   d) switching transmission from said streaming multimedia file to said alternative media file stored in said first cache;
   e) storing in a second cache said streaming multimedia file received during the transmission of said alternative media file; and
   f) upon completion of said alternative media file, accessing said second cache and resuming transmission of the cached streaming multimedia file,
   wherein the alternative media file is inserted in the streaming multimedia independent of boundaries of the multimedia file.

21. The method as defined in claim 20 wherein in performing step a), the following steps are performed:
   a1) receiving a request from a predetermined end-user for a streaming multimedia file;
   a2) accessing a rule server with the identity of said end-user, content provider and/or content identity;
   a3) using said identity to select an appropriate type of alternative file for said predetermined end-user and retrieving location information regarding said selected alternative file;
   a4) sending a request for file transfer from a server storing said selected alternative file to the first cache.

22. The method as defined in claim 20 wherein in performing step a), the following steps are performed:
   a1) detecting the start of a streaming multimedia flow;
   a2) accessing a rule server with the identity of said end-user, content provider and/or content identity;
   a3) using said identity to select an appropriate type of alternative file for said predetermined end-user and retrieving location information regarding said selected alternative file;
   a4) sending a request for file transfer from a server storing said selected alternative file to the first cache.

23. The method as defined in claim 20 wherein in performing step d), switching from said streaming multimedia file to said alternative file when recognizing that an alternative file is available.

24. The method as defined in claim 20 wherein in performing step d), switching from said streaming multimedia file to said alternative file at the beginning of said multimedia file.

25. The method as defined in claim 20 wherein in performing step d), switching from said streaming multimedia file to said alternative file at the end of said multimedia file.

26. The method as defined in claim 20 wherein in performing step d), switching from said streaming multimedia file to said alternative file at any location during transmission of said multimedia file.

27. The method as defined in claim 20 wherein in performing step d), providing transition segments between the streaming multimedia file and the alternative file.

28. The method as defined in claim 27 wherein the transition segments provide "fade in" and "fade out" between said files.

29. The method as defined in claim 20 wherein in performing step d), switching from said streaming multimedia file to said alternative file based on a timing signal embedded in said streaming multimedia file.

* * * * *